United States Patent [19]

Winderman et al.

[11] 4,282,527
[45] Aug. 4, 1981

[54] MULTI-SPECTRAL DETECTION SYSTEM WITH COMMON COLLECTING MEANS

[75] Inventors: Jay B. Winderman, Claremont; Fernand B. Kuffer, Brea, both of Calif.

[73] Assignee: General Dynamics, Pomona Division, Pomona, Calif.

[21] Appl. No.: 47,452

[22] Filed: Jun. 11, 1979

[51] Int. Cl.³ .................... H01Q 21/28; G02B 5/16
[52] U.S. Cl. .................. 343/725; 343/781 CA; 343/6 ND; 350/96.10; 350/96.18
[58] Field of Search ............... 343/700 MS, 781 CA, 343/840, 725, 6 ND; 350/96.10, 96.18

[56] References Cited

U.S. PATENT DOCUMENTS

| | | | |
|---|---|---|---|
| 2,648,779 | 8/1953 | Kohl | 250/351 |
| 2,895,127 | 7/1959 | Padgett | 343/6 ND |
| 2,972,743 | 2/1961 | Svensson et al. | 343/6 ND |
| 3,010,102 | 11/1961 | Ketchledge et al. | 343/6 ND |
| 3,114,149 | 12/1963 | Jessen | 343/6 ND |
| 3,165,749 | 1/1965 | Cushner | 343/6 ND |
| 3,242,485 | 3/1966 | Astheimer | 343/6 ND |
| 3,276,022 | 9/1966 | Brunner | 343/840 |
| 3,320,420 | 5/1967 | Paglee et al. | 343/6 ND |
| 3,331,072 | 7/1967 | Pease | 343/781 CA |
| 3,683,379 | 8/1972 | Saddler et al. | 343/721 |
| 3,713,156 | 1/1973 | Pothier | 343/6 ND |
| 3,763,493 | 10/1973 | Shimada et al. | 343/781 CA |
| 3,914,768 | 10/1975 | Ohm | 343/781 CA |
| 4,041,500 | 8/1977 | Lapp | 343/761 |
| 4,042,935 | 8/1977 | Ajioka et al. | 343/840 |
| 4,138,684 | 2/1979 | Kerr | 343/700 MS |

FOREIGN PATENT DOCUMENTS 335425 2/1959 Switzerland .......................... 343/840

Primary Examiner—Eli Lieberman
Attorney, Agent, or Firm—Neil F. Martin; Freling E. Baker; Edward B. Johnson

[57] ABSTRACT

A multi-spectral detection system for detecting radiation within frequency bands that are in diverse portions of the electromagnetic spectrum is disclosed. The preferred embodiment is a Cassegrain system including a primary reflector for reflecting radiant energy in the radio frequency and infrared portions of the electromagnetic spectrum; a subreflector positioned along the axis of the primary reflector for re-reflecting the radiant energy reflected from the primary reflector toward the primary reflector and focusing the re-reflected radiant energy in a common focal plane about the system axis; a feed horn coaxially positioned at the common focal plane and having an entrance in the common focal plane about the system axis for transferring the collected radio frequency radiant energy from the focal plane to a detector of radio frequency radiant energy; and a bundle of optical fibers coaxially positioned at the common focal plane and having openings in the common focal plane about the system axis for transferring collected infrared radiant energy from the focal plane to a detector of infrared radiant energy. A baffle is coaxially positioned for blocking light other than the re-reflected infrared radiation from being received and transferred by the optical fibers.

2 Claims, 1 Drawing Figure

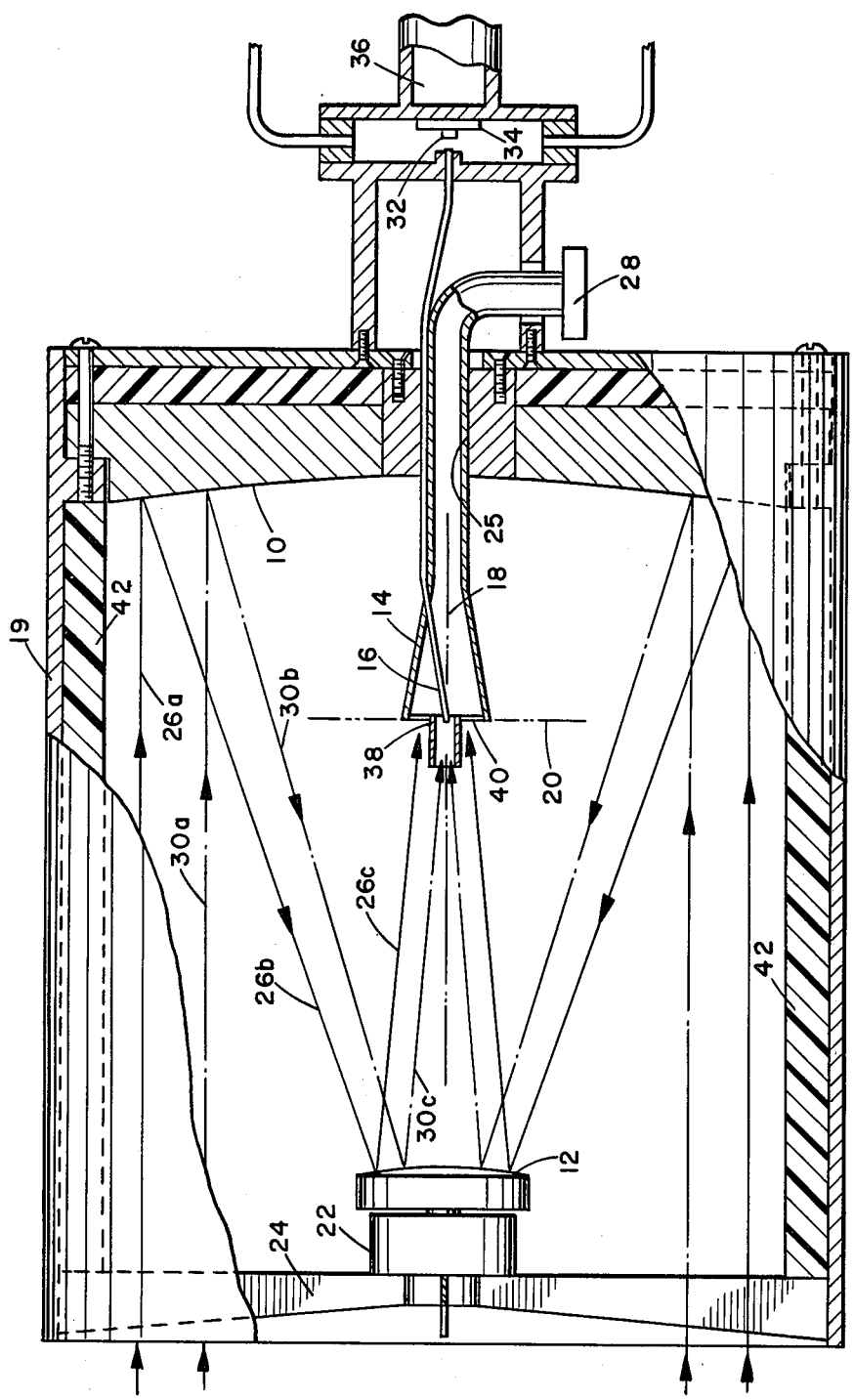

MULTI-SPECTRAL DETECTION SYSTEM WITH COMMON COLLECTING MEANS

BACKGROUND OF THE INVENTION

The present invention generally pertains to antenna systems and is particularly directed to an improvement in multi-spectral detection systems.

A multi-spectral detection system may be used for detecting radiation in diverse portions of the electromagnetic spectrum. The electromagnetic spectrum includes both radio frequency radiation and electro-optical radiation. Radio frequency radiation includes microwave, millimeter wave and sub-millimeter wave radiation. Electro-optical radiation includes infrared, visible and ultraviolet light.

Radio frequency and electro-optical radiation detection systems have been employed to detect the presence of and/or track moving and stationary objects and to measure some of their characteristics. The uses of these systems range from the detection of military targets to the spectral analysis of molten metals.

A particular implementation for a multi-spectral detection system is in a miniature weapon system, for enabling operation in adverse weather (e.g., fog, haze, rain). Such a system provides comprehensive false target discrimination by employing two or more radiation detectors operating in diverse portions of the electromagnetic spectrum. The detectors generate unique target signature data which are correlated to provide a target/no-target decision with a high confidence level. A specific embodiment is a combined millimeter wave/infrared detection system.

Both active millimeter wave detection systems and passive infrared detection systems perform well against vehicular ground targets under some adverse weather conditions, and each can provide limited false target rejection capability. The active millimeter wave detection system detects metallic objects by means of reflection and backscatter. It utilizes a relatively wide antenna beam which is effective during a wide area target search. It also can employ range and/or moving target indication circuits to enhance target discrimination. Moreover, millimeter wave radiation can penetrate fog and atmospheric particulates with little attenuation.

The passive infrared detection system detects objects by means of inherent temperature differentials. It utilizes a relatively narrow beam for fine tracking and it can employ multiple frequency bands to provide discrimination against flares, burning vehicles, and sunglints. Infrared radiation can penetrate chaff and moderate rain efficiently.

It is an object of the present invention to provide an improved multi-spectral detection system that will enhance the achievement of high probability acquisition and accurate tracking of vehicular ground targets under most adverse weather conditions, while at the same time providing comprehensive false target rejection capability.

SUMMARY OF THE INVENTION

The present invention is an improved multi-spectral detection system for detecting radiation within frequency bands that are in diverse portions of the electromagnetic spectrum. A first band is in the radio frequency portion; and a second band is in the ultraviolet-through-infrared portion. The detection system of the present invention includes common radiant energy collection elements having a boresight axis for collecting radiant energy in the diverse portions of the electromagnetic spectrum and focusing the collected energy in a common focal plane about the axis; a feed horn coaxially positioned at the common focal plane for transferring the collected radio frequency from the focal plane to a radio frequency detector; and optical fibers coaxially positioned at the common focal plane for transferring the collected light energy of the spectra from the focal plane to a detector of light energy. The boresight axis may be a compensated boresight axis for the different elements of the system.

The common radiant energy collection elements are a Cassegrain primary reflector for reflecting radiant energy in the predetermined diverse portions of the electromagnetic spectrum; and a Cassegrain subreflector positioned along the axis of the primary reflector for re-flecting radiant energy reflected from the primary reflector along the boresight axis and focusing the re-reflected radiant energy in the common focal plane about the axis. A baffle is coaxially positioned for blocking light other than the re-reflected radiation from being received and transferred by the optical fibers.

An advantage of the common focal plane feature to multispectral detection is that it conserves space and reduces cost while increasing accuracy and range.

One major advantage of the common collection element feature is that it achieves a common boresight for all modes of operation, thereby eliminating pointing errors among the sensors. Another important advantage of this feature is reduction in cost relative to a system that must employ multiple sets of collecting elements.

Any combination of two or more detectors which operate in widely separated regions of the electromagnetic spectrum can be used with the detection system of the present invention. These combinations include, but are not limited to the following:

1. Radio frequency (RF), including microwave, millimeter wave, and submillimeter wave.
2. Electro-optical, including infrared (IR), visible and ultraviolet (UV).

The system can be reflective, refractive, or catadioptic (utilizing a combination of reflective and refractive elements), and it can employ combinations of positive, negative, and planar collecting surfaces. It is important that at least one of the collection elements must be utilized for collecting radiant energy for all of the detectors.

A multi-spectral detection system of the present invention can be applied to the detection and/or identification of many kinds of objects or classes of objects—from raw materials to manufactured products to natural environments—as well as discrimination among such objects or classes of objects. A preferred embodiment of the detection is useful for providing adverse weather acquisition and tracking of military targets plus comprehensive false target discrimination. The system also can be employed in such diverse commercial applications as fault diagnosis in mechanical systems and the locations and identifications of lost vehicles and downed aircraft.

Additional features of the present invention are discussed in relation to the description of the preferred embodiment.

BRIEF DESCRIPTION OF THE DRAWINGS

The FIGURE of the Drawing is a side elevation view with portions cut away of a multi-spectral detection system according to the present invention.

DESCRIPTION OF THE PREFERRED EMBODIMENT

Referring to the Drawing, a preferred embodiment of the multi-spectral detection system of the present invention essentially includes a primary reflector 10 and a subreflector combined in a Cassegrain antenna configuration; a feed horn 14; and a bundle of optical fibers 16.

The primary reflector 10 has a boresight axis 18. The primary reflector is designed for reflecting radiant energy in both the infrared and radio frequency portions of the electromagnetic spectrum. The primary antenna is mounted at one end of a cylindrical supporting frame 19.

The subreflector 12 is coaxially positioned along the axis 18 of the primary reflector 10 and is designed for re-reflecting infrared and radio frequency (RF) radiation from the primary reflector 10 toward the primary reflector 10 along said boresight axis 18 and focusing the re-reflected radiation in a common focal plane 20 about the axis 18. The subreflector 12 is canted and mounted on a spin motor 22 for rotation so as to provide a conical scan. The spin motor 22 is supported on the frame 19 by a spider 24.

The feed horn 14 extends through an axial passage 25 in the primary reflector 10, and has an entrance in the common focal plane 20 about the axis 18 for transferring collected millimeter wave RF radiation (shown by lines 26a, 26b, 26c) reflected by the primary reflector 10 and re-reflected by the subreflector 12 to an RF detector and receiver (not shown) coupled to the opposite end 28 of the feed horn 14.

The optical fibers 16 have first exposed openings in the common focal plane 20 about the axis 18. The optical fibers 16 extend through the axial passage 25 in the primary reflector 10 for transferring collected infrared radiation (shown by lines 30a, 30b, 30c) reflected by the primary reflector 10 and re-reflected by the subreflector 12 to an infrared detector 32 mounted behind the primary reflector 10. The infrared detector 32 is mounted on a substrate 34 that is coupled to a cryostat 36 for cooling the infared detector 32.

A baffle 38 is coaxially mounted at the openings of the optical fibers 16 in the common focal plane 20 for blocking light other than re-reflected infrared radiation 30 from being received and transferred by the optical fibers 14. The baffle 38 is supported at the entrance of the feed horn 14 by a plate of RF transparent material 40 mounted on the feed horn 14.

A layer of RF absorbent material 42 is attached to the inside of the supporting frame 19 for reducing reflections of millimeter wave sidelobe radiation from the frame 19.

The use of optical fibers 16 for transferring the infrared energy allows the infrared detector 32 to be positioned behind the primary reflector 10, where it is out of the RF millimeter wave radiation field, where it can be cooled conveniently, and where it can be interchanged readily. And the optical fibers 16 also enable the focused image at the common focal plane 20 to be transferred to the detector 32, thereby creating the effect of the detector 32 being positioned in the common focal plane 20.

In the preferred embodiment shown in the Drawing, the common focal plane 20 is between the primary reflector 10 and the subreflector 12. In alternative preferred embodiments the common focal plane may be located behind the primary reflector 10, whereby the re-reflected radiation 26c, 30c passes through the passage 25 in the primary reflector 10 to detectors of the respective forms of radiant energy.

We claim:

1. A multi-spectral detection system for detecting radiation within frequency bands that are in diverse portions of the electromagnetic spectrum, a first band being in the radio frequency portion, and a second band being in the ultraviolet-through-infrared portion, comprising:

common radiant energy collection means having a boresight axis for collecting radiant energy in said diverse portions of the electromagnetic spectrum and focusing said collected energy in a common focal plane about said axis;

first means coaxially positioned at said common focal plane for transferring said collected radiant energy in said first band from said focal plane to a detector of said radiant energy in said first band; and second means coaxially positioned at said common focal plane for transferring said collected radiant energy in said second band from said focal plane to a detector of said radiant energy in said second band;

wherein the collection means comprise:

a Cassegrain primary reflector for reflecting radiant energy in said predetermined diverse portions of the electromagnetic spectrum; and a Cassegrain subreflector positioned along the axis of the primary reflector for re-reflecting radiant energy reflected from the primary reflector along said boresight axis and focusing said re-reflected radiant energy in a common focal plane about said axis;

wherein the first means comprises a feed horn having an entrance in said common focal plane about said axis;

wherein the second means comprises optical fibers having openings in said common focal plane about said axis; and wherein the system further comprises:

a baffle coaxially positioned for blocking light other than said re-reflected radiation from being received and transferred by the optical fibers.

2. A multi-spectral detection system for detecting radiation within frequency bands that are in diverse portions of the electromagnetic spectrum, a first band being in the radio frequency portion, and a second band being in the ultraviolet-through-infrared portion, comprising:

common radiant energy collection means having a boresight axis for collecting radiant energy in said diverse portions of the electromagnetic spectrum and focusing said collected energy in a common focal plane about said axis;

first means coaxially positioned at said common focal plane for transferring said collected radiant energy in said first band from said focal plane to a detector of said radiant energy in said first band; and second means coaxially positioned at said common focal plane for transferring said collected radiant energy in said second band from said focal plane to a detector of said radiant energy in said second band;

wherein the collection means comprise:

a Cassegrain primary reflector for reflecting radiant energy in said predetermined diverse portions of the electromagnetic spectrum; and a Cassegrain subreflector positioned along the axis of the primary reflector for re-reflecting radiant energy reflected from the primary reflector along said boresight axis and focusing said re-reflected radiant energy in a common focal plane about said axis;

wherein the common focal plane is located between the primary and secondary reflectors;

wherein the primary reflector contains a passage along said axis;

wherein the first means comprises a feed horn extending through the passage and having an entrance in said common focal plane about said axis;

wherein the second means comprises optical fibers extending through the passage and having openings in said focal plane about said axis; and wherein the system further comprises:

a baffle coaxially positioned for blocking light other than said re-reflected radiation from being received and transferred by the optical fibers.

* * * * *